United States Patent
Li

(10) Patent No.: US 9,992,110 B2
(45) Date of Patent: Jun. 5, 2018

(54) DYNAMIC SWITCHING CONTROL OVER MULTIPLE INTERNET SERVICES PROVIDED FOR HOME NETWORKS

(71) Applicant: Algoblu Holdings Limited, Grand Cayman (KY)

(72) Inventor: Ming Li, Beijing (CN)

(73) Assignee: Algoblu Holdings Limited, Grand Cayman (KY)

( * ) Notice: Subject to any disclaimer, the term of this patent is extended or adjusted under 35 U.S.C. 154(b) by 57 days.

(21) Appl. No.: 15/151,816

(22) Filed: May 11, 2016

(65) Prior Publication Data

US 2017/0279715 A1 Sep. 28, 2017

(30) Foreign Application Priority Data

Mar. 25, 2016 (CN) .......................... 2016 1 0180172

(51) Int. Cl.
| | |
|---|---|
| H04L 12/741 | (2013.01) |
| H04L 12/26 | (2006.01) |
| H04L 12/733 | (2013.01) |
| H04L 12/947 | (2013.01) |
| H04L 29/12 | (2006.01) |
| H04L 29/06 | (2006.01) |
| H04L 12/46 | (2006.01) |

(52) U.S. Cl.
CPC .......... *H04L 45/74* (2013.01); *H04L 43/0829* (2013.01); *H04L 45/20* (2013.01); *H04L 49/25* (2013.01); *H04L 61/2007* (2013.01); *H04L 69/16* (2013.01); *H04L 12/4641* (2013.01)

(58) Field of Classification Search
None
See application file for complete search history.

(56) References Cited

U.S. PATENT DOCUMENTS

| | | | |
|---|---|---|---|
| 2004/0136368 A1* | 7/2004 | Wakayama | H04L 29/06 370/389 |
| 2008/0310419 A1* | 12/2008 | Bansal | H04L 45/00 370/395.6 |
| 2011/0149733 A1 | 6/2011 | Chen | |
| 2014/0016647 A1* | 1/2014 | Yoshida | H04L 12/4666 370/395.53 |
| 2014/0293781 A1* | 10/2014 | Adams | H04W 48/18 370/230 |

FOREIGN PATENT DOCUMENTS

| | | |
|---|---|---|
| CN | 101582904 | 11/2009 |
| EP | 2355423 | 8/2011 |

* cited by examiner

Primary Examiner — Sulaiman Nooristany

(57) ABSTRACT

System and method of dynamically switching among multiple WANs for data transmission to and from a LAN based on real-time network performance. Each WAN may be owned by a respective Internet Service Provider (ISP) of the LAN. A switching device coupled between the WAN and the LAN evaluates the real-time network performance of the current WAN used for data transmission between a LAN user device and a target IP address. If the network performance deteriorates, the switching device may select a different WAN for the data transmission according to a set of service quality policies. The switching device may maintain a flow table to control data routing and communicate with other components in the LAN in compliance with the OpenFlow protocol.

19 Claims, 4 Drawing Sheets

DYNAMIC SWITCHING CONTROL OVER MULTIPLE INTERNET SERVICES PROVIDED FOR HOME NETWORKS

CROSS REFERENCE

This application claims priority to and benefit of Chinese Patent Application No. 201610180172.0, file on Mar. 25, 2016, the entire content of which is herein incorporated by reference for all purposes.

TECHNICAL FIELD

The present disclosure relates generally to the field of communication networks and, more specifically, to the field of network routing in communication networks.

BACKGROUND OF THE INVENTION

Some local area networks (LANs) use more than one wide area network (WAN) from different Internet Service Providers (ISPs) for access to the Internet. Typically, each terminal device within the LAN is assigned with multiple IP addresses corresponding to the multiple ISPs, which may be static or dynamic IP addresses. To balance the traffic, the multiple WANs can be assigned to different user groups of the LAN. Alternatively, the WANs can be assigned based on the target IP addresses. Either type of assignment with respect to the usage of the WANs is usually defined by an LAN user and remains fixed until being manually changed.

In real life, with regard to a certain target IP address, a different WAN coupled to the LAN may sometimes offer better service quality than the assigned WAN. However, limited by the fixed WAN assignment, the LAN cannot make efficient use of the services provided by the multiple ISPs.

SUMMARY OF THE INVENTION

Therefore, it would be advantageous to provide a routing mechanism for an LAN that enhances the usage efficiency of the multiple Wide Area Networks (WANs) coupled to the LAN and thereby improves the quality of service for the LAN.

Embodiments of the present disclosure provide a switching device capable of dynamically switching among multiple WANs for data transmission to and from an LAN based on real-time network performance evaluated at the LAN. Each WAN may be provided by a respective Internet Service Provider (ISP). The switching device is communicably coupled to the modems of the WANs and to a gateway in the LAN. The switching device maintains a flow table to control data routing and communicate with the modem and the gateway in the OpenFlow protocol.

A first WAN may be initially selected based on the requested target IP address according to a default setting which explicitly or implicitly pre-assigns the WANs based on target IP addresses for load balancing. The switching device monitors the network performance of the first WAN with respect to the target IP in real-time. If the switching device detects that the network performance has dropped below the predetermined criteria, it automatically selects another WAN for routing data between the target IP address and the user device. The network performance can be measured by round-trip time (RTT), packet loss, and/or any other suitable metric. A switching time limit can be applied to prevent switching oscillation. Switching from one WAN to another may be restricted to new visiting connections to the target IP to avoid loss of data that has been transmitted.

Since the switching device dynamically selects from multiple WAN for data routing based on the current network performance with respect to a target IP address, the bandwidths of the multiple WANs can be advantageously and efficiently used in a consistent manner. By virtue of dynamic switching, a WAN providing poor service quality for a target IP address can be promptly and automatically replaced for the data transmission. As a result, the overall service quality to the LAN and user experience is effectively enhanced.

In one embodiment of the present disclosure, a method of managing data transmission at an LAN that is coupled to multiple WANs includes routing data transmission between an LAN terminal device and a target Internet Protocol (IP) address through a first communication network that is controlled by a first ISP. The network performance of data transmission between the terminal device and the target IP address is dynamically evaluated. Based on the evaluation, a second communication network that is controlled by a second ISP may be selected and replace the first communication network for routing data transmission between the LAN and the target IP address.

The foregoing is a summary and thus contains, by necessity, simplifications, generalization, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION

Figure 1:
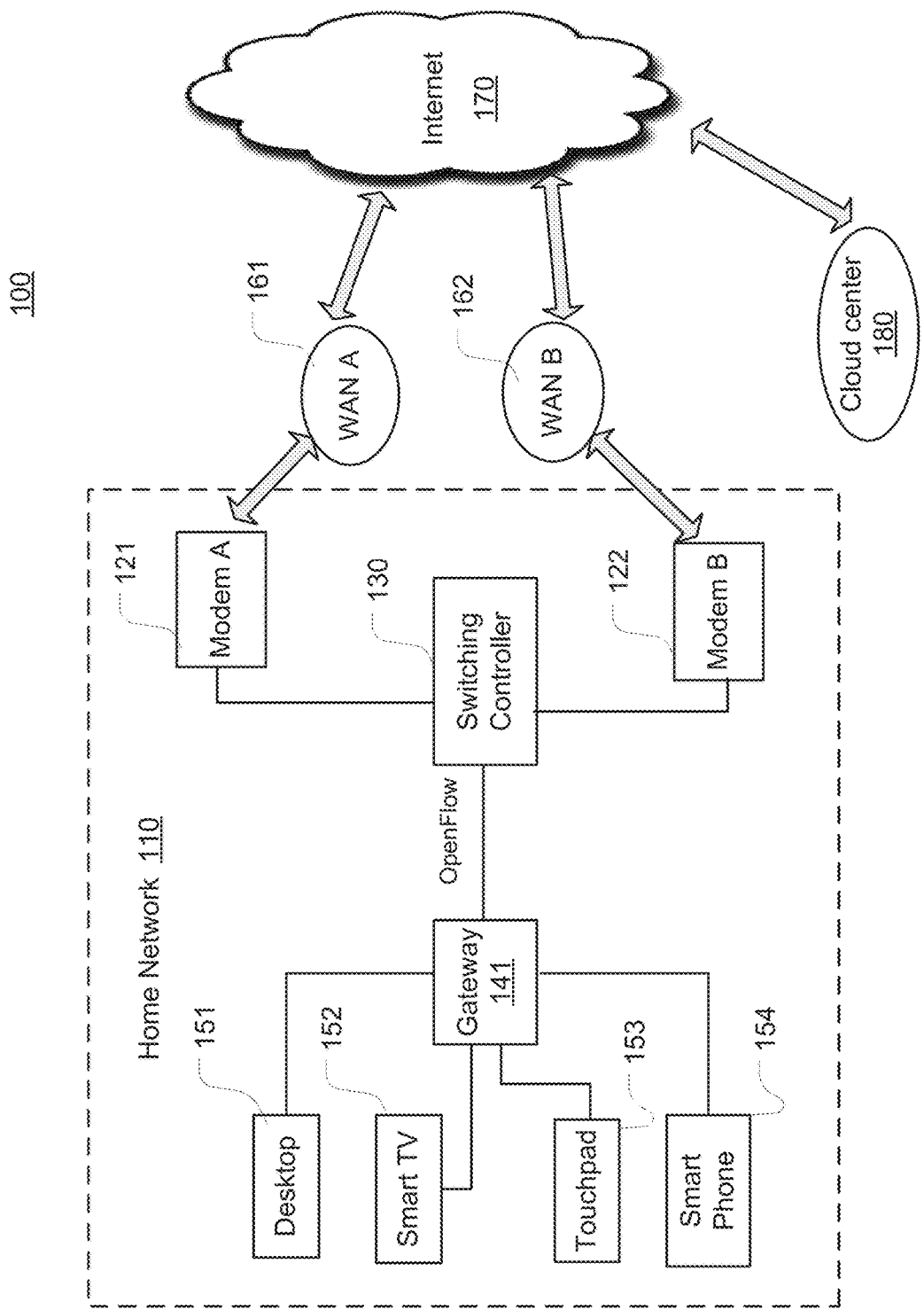
FIG. 1 illustrates an exemplary network system for a home network that uses two WANs for access to the Internet according to an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed} description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. Although a method may be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature:

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Dynamic Switching Control over Multiple Internet Services Provided for Home Networks Overall, embodiments of the present disclosure utilize a switching device within a Local Area Network (LAN) to dynamically select from multiple Wide Area Networks (WANs) for Internet access to a target IP address. The switching device is equipped to detect the real-time network performance of the current WAN. If it determines that the network performance has deteriorated below a threshold, the switching device may automatically select and switch to another WAN for Internet access to the target IP address according a set of policies. As a result, persistent poor performance can be promptly and effectively prevented.

An LAN referred herein is a computer network in a limited area based on Ethernet over twisted pair cabling and/or Wi-Fi for data transmission, such as a residential, school, laboratory or office building. The multiple WANs coupled to an LAN may include WANs provided by different Internet Service Providers (ISPs), a Multiprotocol Label Switching (MPLS), a Virtual Private Network (VPN), and etc.

FIG. 1 illustrates an exemplary network system 100 for a home network 110 that uses two WANs 161 and 162 for access to the Internet 170 according to an embodiment of the present disclosure. The WANs 161 and 162 are coupled to the home network 110 through modems 121 and 122. The home network 110 includes a number of user devices 151-154 (or terminal devices) communicably coupled to a gateway 141. It will be appreciated that the gateway 141 may be integrated in a device with other network components, such as a router. Each terminal device is assigned with two IP addresses, one by a respective ISP. The assigned IP addresses may be static or dynamic IP addresses. It will be appreciated that the present disclosure is not limited by the network architecture of the LAN, which may include any suitable user device, control device, or any other component that is well-known in the art.

According to the present disclosure, a switching controller 130 is used to intelligently and dynamically select a WAN for providing data transmission between a terminal device and a target IP address. In this example, the switching controller 130 is coupled between the gateway 141 and the modems 121 and 122. For instance, when a user uses the terminal device 151 to visit a website, the data transmission between the terminal device 151 and the website host (not explicitly shown) is initially routed through the WAN A 161 in combination with the gateway 141 and modem A 121. As described in greater detail below, the WAN A 161 may be selected as the initial WAN according to a default setting based on the target IP address, the user group, or the application program generating the visiting request.

During the data transmission, the switching controller 130 continuously monitors the real-time network performance by the WAN A 161. If the switching controller 130 determines that the network performance deteriorates below the predetermined criteria, it applies a set of policies to comprehensively evaluate the service quality of both WANs 161 and 162. Based on the evaluation result, the switching device may switch to the WAN B 162 for data transmission between the terminal device 151 and the website host. Likewise, if later the switching device detects that the network performance of the WAN B 162 deteriorates, the switching controller 130 applies the policies again and evaluates whether to switch back to the WAN A 161 for the data transmission. In some embodiments, the switching operations are transparent to the terminal device 151 to ensure seamless transition.

Since the switching device dynamically selects from multiple WAN based on the current network performance for each source-destination connection, the bandwidths of the WANs can be advantageously and efficiently used in a consistent manner. By virtue of the dynamic switching, a WAN providing a poor quality of service can be promptly and automatically replaced for the visiting session. As a result, the overall quality of service to the LAN and user experience is effectively enhanced, despite the fact that the network performance for the target IP address provided by a particular WAN may vary over time.

It will be appreciated that the present disclosure is not limited by the measures or techniques to obtain network performance. The network performance may be represented by collected data that is related to bandwidth, throughput, latency, jitter, error rate, and the like. In one preferred embodiment, the switching device monitors the round-trip time (RTT) and packet loss, which typically are reliable indicators of user experience regarding Internet access.

The present disclosure is not limited by the number or types of WANs that provide Internet access to an LAN. In some embodiments, the switching controller applies a set of policies to decide when to perform switching and which WAN to select to take over the data transmission. Besides the criteria for evaluating the network performance, the set of policies can also combine prescribed rules related to bandwidth capacity, the current bandwidth usage, cost-to-quality ratio, and etc. In some embodiments, the various evaluation factors are weighted and integrated into a mathematical formula for computing a score of a respective WAN, the score representing the overall rank of each WAN with respect to the target IP address. As a result, the WAN with the higher rank can be selected for data transmission. In some embodiments, the set of policies is user-configurable through a user interface on the switching device. The policies may also be updated by downloading from a cloud server 170.

In some embodiments, a time limit may be set as the minimum interval between two switching operations to prevent switching oscillation. The time limit represents a duration in which a particular WAN is unlikely to recover from the poor network performance. Given the time limit, even if the current WAN is determined to be unsatisfactory according to the network performance and the set of switching policies, the switching controller holds off the switching. In some embodiments, the time limit may be dynamically adjusted with a switching occurrence frequency in a certain time period. For example, the time limit increases following each switching operation, e.g., in the sequence of 10 s, 20 s, 80 s, and so on.

The present disclosure is not limited by the protocol or the communication mechanism used between the switching controller and other network components in the LAN and the WANs. In some embodiments, the switching controller maintains and uses a flow table complying with the OpenFlow protocol to control which WAN to forward the data flow between the user device and the target IP address.

In some embodiments, the flow table includes a default setting for WAN assignment, which associates a particular WAN with a target IP address. The assigned WAN is tentatively used for data transmission when current information on the network performance is unavailable, for example, when a user first submits a visiting request. It will be appreciated that the present disclosure is not limited to any mechanism to assign the WANs as used in a switching controller. For example, each WAN is assigned with a respective group of target IP addresses, a respective user group, or a respective category of application programs. The flow table may also specify rules for the default assignments. The default assignments may also be based on heuristic data related to network performance. Due to the overwhelming quantities of the target IP addresses accessible through the Internet as well as the network nodes along the WANs, using a flow table is preferred over the option of a conventional routing table. During the data transmission, each time the switching controller selects a different WAN for a particular target IP address, the flow table is modified with the selected WAN.

Sometimes, switching to a different WAN in the middle of an established connection can cause loss of data that has been transmitted through the current WAN. Thus, in this situation, a switching operation can be delayed until a new connection to the target IP address is requested by the user device. In some embodiments, the switching controller relies on the value of the SYN flag in the transmission control protocol (TCP) packet to determine whether there is a new connection and, therefore, whether switching should be performed. Particularly, if the SYN value is "0," the packet is treated as data in an established connection; and if the SYN value is "1," the packet is treated as a request for initiating a new connection.

Figure 2:
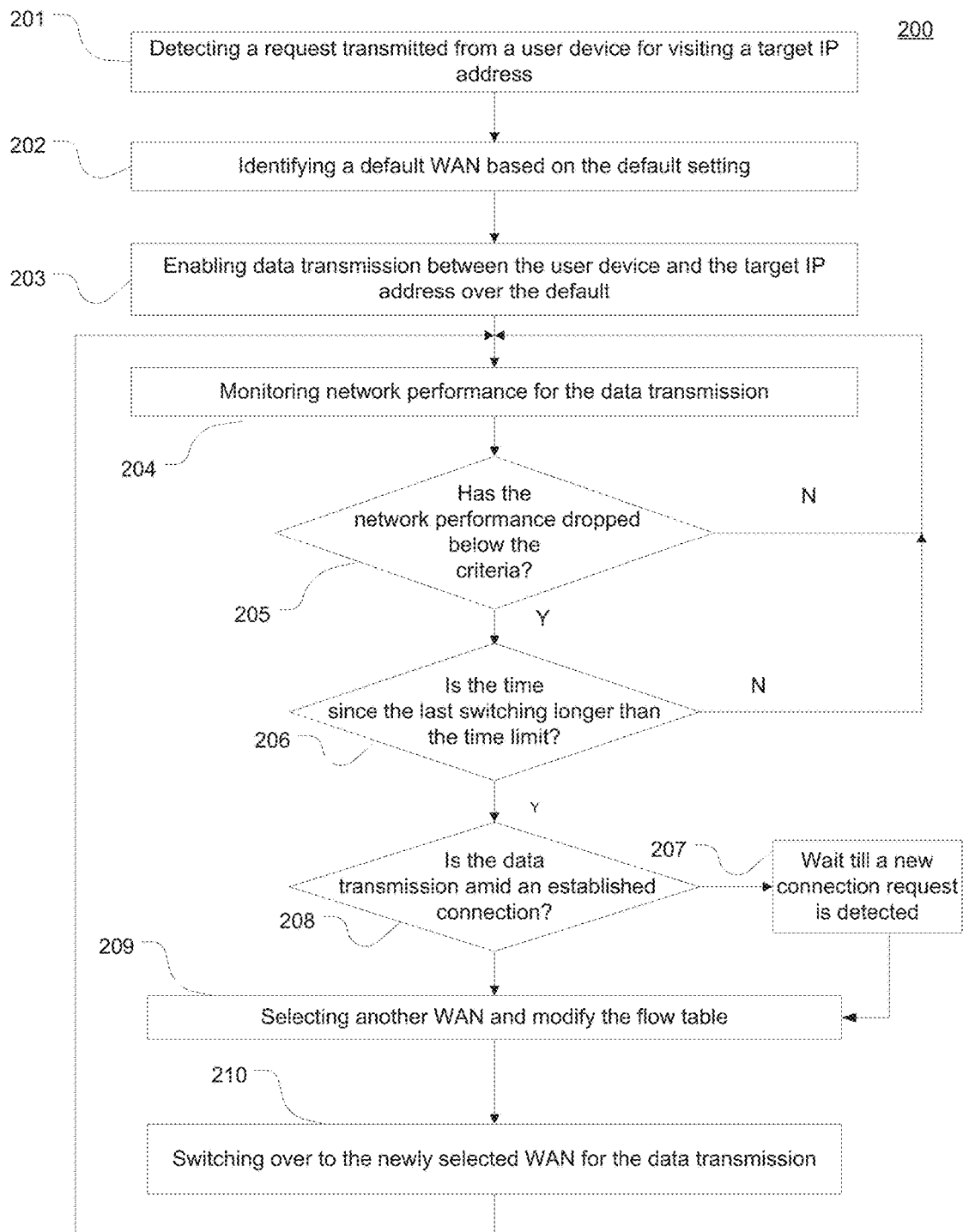
FIG. 2 is a flow chart depicting an exemplary process of dynamically switching among multiple WAN coupled to a LAN in accordance to an embodiment of the present disclosure.

FIG. 2 is a flow chart depicting an exemplary process 200 of dynamically switching among multiple WANs coupled to an LAN in according to an embodiment of the present disclosure. For example, process 200 can be performed by the switching controller 130 in FIG. 1. At 201, a user device in the LAN sends a new visiting request which is detected by the switching controller. The request specifies a target IP address. At 202, a first WAN (or the default WAN) is identified according to the default setting regarding the WAN assignment, for example, based on the target IP address, the user group, or the application program generating the request.

In some embodiments, a HASH function or hardware logic is used to search for the default WAN given the target IP address included in a visiting request. For example, the target IP address is used as a HASH key to calculate a HASH value through the HASH function. The resulted HASH value corresponds to a particular WAN, which is selected as the first WAN to tentatively route data.

At 203, the switching controller forwards the data packets to the first WAN to enable data transmission between the user device and the target IP address. At 204, during the data transmission, the switching controller monitors the network performance of the first WAN with respect to the data transmission in real-time. At 205, it is determined whether the network performance has dropped below the criteria. The network performance may be represented by a score computed by integrating the values of various factors according to a mathematical relation. The mathematical relation is determined according to a set of policies regarding a combination of network performance, administrative and financial factors, and any other factors. If the network performance has become unsatisfactory, at 206, it is further determined if it has been longer than the time limit since the last switching operation. If not, the switching operation is skipped or delayed.

At 208, it is determined if the data transmission is amid an established connection. If yes, at 207, the switching operation is delayed until a new connection for the target IP address is requested and received at the switching controller.

If it is determined that the time limit has been reached and the new connection request has been received, a different WAN can be selected according to the mathematic relation. Alternatively, a different WAN is selected without computation, especially when only two WANs are coupled to the LAN. Accordingly, the flow table is updated to reflect the change at 209 with the newly selected WAN.

At 210, according to the modified flow table, subsequent data packets are forwarded to the new WAN for transmission. The foregoing process 204-210 is repeated while the data transmission continues between the user device and the target IP address.

Figure 3:
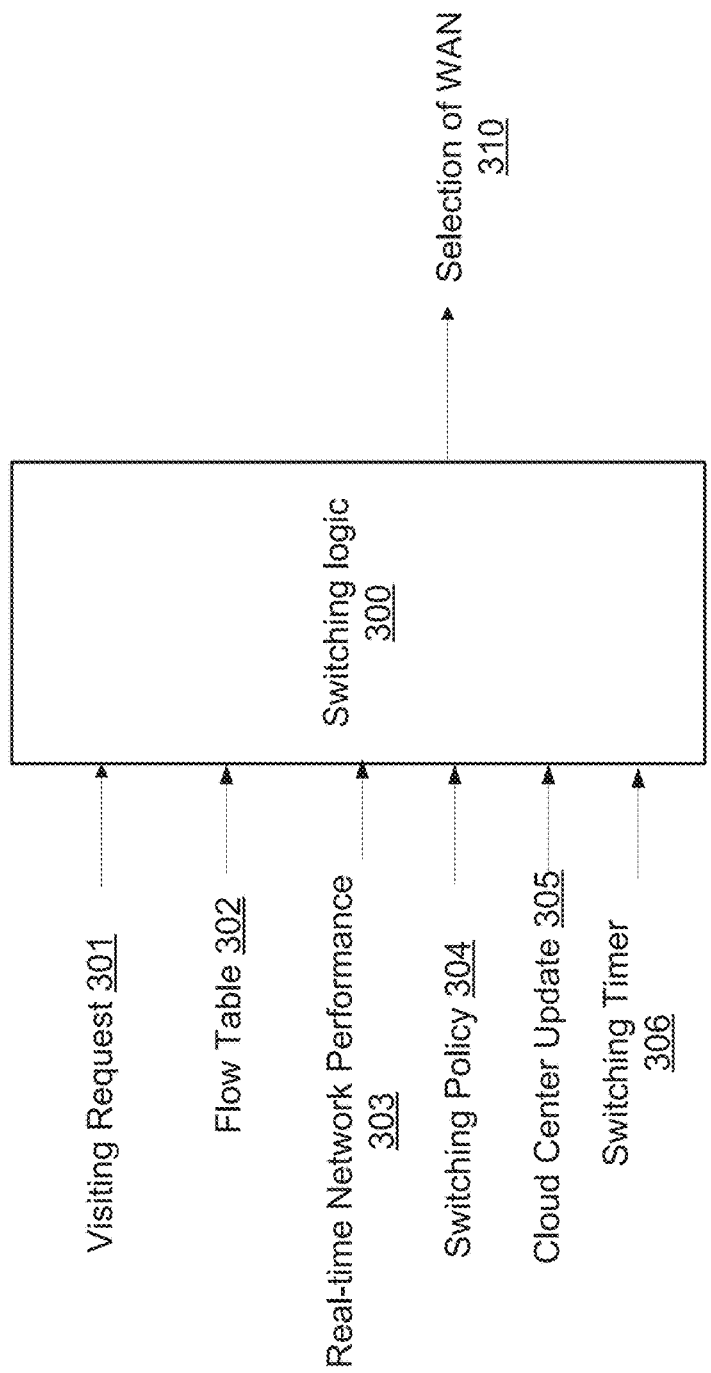
FIG. 3 illustrates the various input information used by exemplary switching logic for generating a decision with regard to WAN selection according to an embodiment of the present disclosure.

FIG. 3 illustrates the various input information used by exemplary switching logic 300 for generating a decision with regard to WAN selection according to an embodiment of the present disclosure. The switching logic 300 is included in a switching controller as described in FIG. 1 and may be implemented as software program, hardware circuitry or a combination thereof. During operation, the switching logic 300 receives a visiting request 301 transmitted from an LAN user device. The switching logic 300 extracts a target IP address from the visiting request 301. The switching logic 300 can also identify the SYN value from the TCP packet to determine whether the request is for a new connection or an established one.

In this example, the switching controller stores a flow table 302 listing the routing information in the format defined by the OpenFlow protocol. The flow table 302 includes the initial assignment of the WAN links, which can be random or based on a set of rules. Upon receiving a new visiting request, the switching logic 300 matches the requested target IP with a default WAN according to the set of rules and by using a HASH function, and directs the data transmission default WAN. The flow table, including the default assignment and a set of switching policies 305, can be updated by downloading from an external device, e.g., remotely from a cloud center.

The switching logic 300 collects the real-time network performance data and dynamically measures the service quality with respect to the target IP address according to the switching policies. Based on the service quality, the switching controller selects a WAN, which is entered in the flow table 302 for directing subsequent data transmission between the user device and the target IP address. The selection decision 310 can also be made by incorporating the switching frequency, the switching time limit 306, and the SYN value to determine whether to perform the switching. It will be appreciated that a wide range of other types of information can also be used by the switching logic to derive a WAN selection/switching decision without departing the scope of the present disclosure.

Figure 4:
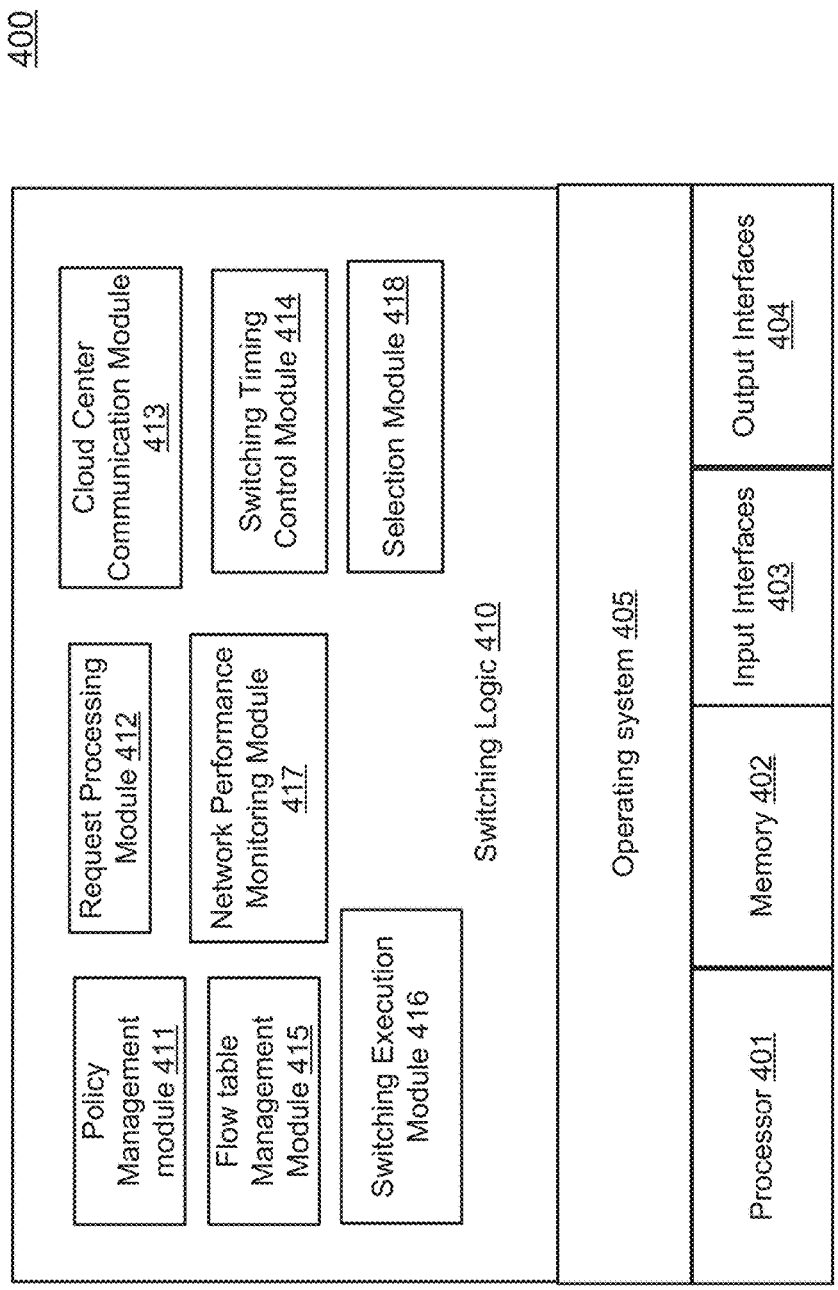
FIG. 4 illustrates the configuration of an exemplary switching controller capable of directing data traffic for a LAN to the dynamically-selected WAN in accordance to an embodiment of the present disclosure.

A switching controller according to the present disclosure can be implemented as an individual controller or integrated with the gateway, router or any other type of network devices. FIG. 4 illustrates the configuration of an exemplary switching controller 400 capable of directing data traffic for an LAN to the dynamically-selected WAN in accordance with an embodiment of the present disclosure. The switching controller 400 includes a processor 401, memory 402, the input interfaces 403, the output interfaces 404, an operating system 405 and the switching logic 410. The input interfaces 403 include multiple ports respectively for coupling to the modems of the available WAN links. The output interface 404 includes a port for coupling to a gateway of an LAN.

The switching logic includes a policy management module 411, a request processing module 412, a cloud center communication module 413, a flow table management module 415, a switch timing control module 414, a switch execution module 416, a network performance monitoring module 417, and a selection module 418. Depending on the embodiments, some or all of the modules in the switching logic 410 can be implemented as instructions stored in the memory 402 that are executable by the processor 401.

The policy management module 411 is configured to process user-configurable policies of various aspects, such as network performance, price, security, priority, and etc. A number of factors may be integrated in a mathematic formula for dynamically computing a rank score for a respective WAN. A set of policies can be downloaded from an external device, e.g., remotely from a cloud center through the cloud center communication module 413. The request processing module 412 is configured to process a visiting request generated from a user device and derive the source and target IP addresses and the new connection identifier, e.g., the SYN value.

The flow table management module 415 maintains and updates a flow table based WAN selection/switching decisions. A flow table with a default WAN assignment can also be downloaded from an external device, e.g., remotely from a cloud center through the cloud center communication module 413. Given a new visiting request, the flow table management module 415 is configured to match the target IP address with a WAN based on the default assignment.

The network performance module 417 collects and evaluates the network performance data in real-time against the predetermined criteria. The switching timing control module 414 controls a switching frequency of the switching controller with regard to visiting a particular target IP address. The switching timing control module 414 can adjust the time limit for consecutive switching operations based on the actual switching frequency. For example, during a certain interval, if a switching operation is performed each time the time limit reaches, the time limit can be incremented in a fixed step or varying steps; and vice versa.

The selection module 418 computes a rank score for each WAN based on the network performance according to the policies and outcomes a decision on whether to perform a switching operation and which WAN is selected to switch to. The switching execution module 416 executes the decision by forwarding the data packets to the selected WAN for the data transmission for the target IP address.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method performed by a switching device for managing data transmission at a local area network (LAN) that is coupled to multiple communication networks respectively controlled by a plurality of Internet Service Providers (ISP), said method comprising:

said switching device selecting a first communication network for supplying Internet connection for said LAN and for routing data transmission between a terminal device in said LAN and a target Internet Protocol (IP) address through said first communication network, wherein said first communication network that is controlled by a first ISP of said plurality of ISPs;

said switching device dynamically monitoring and evaluating network performance of data transmission between said terminal device and said target IP address via said first communication network in both transmission directions during a transmission connection between said terminal device and said target IP address; and responsive to a determination that said network performance is below predetermined criteria, said switching device dynamically switching to a second communication network for supplying Internet connection for said LAN and for routing data transmission between said terminal device and said target IP address, wherein said second communication network is controlled by a second ISP of said plurality of ISPs, wherein said determination is performed by said switching device based on said dynamically monitoring and evaluating and during said data transmission, wherein said switching device are coupled to said LAN and to said first and said second communication networks through interface ports in said switching device, wherein said switching device is a separate device from any terminal device in said LAN, wherein said dynamically switching is transparent to said terminal device and wherein said switching to said second communication network comprises updating a flow table in a format defined in compliance with an OpenFlow Protocol, and wherein further said routing data transmission comprises referring to said flow table.

2. The method of claim 1, wherein said dynamically monitoring and evaluating comprises monitoring a hop count of a data packet and a number of lost packets against predetermined values at a node in said LAN.

3. The method of claim 1 further comprising, in response to a request for visiting said target IP address, selecting said first communication network according to a default configuration.

4. The method of claim 3, wherein said default configuration assigns a respective set of target IP addresses to each of said multiple communication network, and wherein said selecting comprises calculating a HASH value based on said target address through a HASH function, and wherein said first communication network corresponds to said HASH value.

5. The method of claim 3 further comprising remotely downloading a flow table that comprise an updated default configuration from a server.

6. The method of claim 1 further comprising, based on said dynamically evaluating and a time limit, switching back to said first communication network for routing data transmission between said terminal device and said target IP address, wherein a duration between said switching and said switching back is greater than said time limit.

7. The method of claim 1 further comprising adjusting said time limit based on a switching frequency between said first communication network and said second communication network.

8. The method of claim 1, wherein said multiple communication networks comprises a Virtual private network (VPN) and a plurality of Wide Area Networks (WAN).

9. The method of claim 1 further comprises:
receiving a TCP data packet transmitted from said terminal device, wherein said switching back to said first communication network is performed based on a determination that said TCP data packet comprises a field value indicating a new connection request.

10. A network device comprising:
a plurality of first interface ports configured to coupled said network device to multiple wide area networks (WANs);
a second interface port configured to couple said network device to a local area network (LAN), wherein said LAN comprises a user device, where said network device is a separate device from any user device in said LAN;
switching logic configured to:
select a first WAN from said multiple WANs for supplying Internet connection for said LAN;
identify a request for data transmission between said user device and a target IP address;
route said data transmission through said first WAN;
monitor and evaluate network performance in real-time with respect to said data transmission in both transmission directions during a transmission connection between said terminal device and said target IP address;
responsive to a determination that said network performance is below predetermined criteria and during said data transmission, identify a second WAN of said multiple WANs based on evaluated network performance and a set of switching policies;
dynamically switch said data transmission to said second WAN for supplying Internet connection for said LAN based on said network performance and predetermined criteria, wherein switching said data transmission to said WAN is transparent to said user device; and
memory configured to store a default configuration for assigning multiple sets of target IP addresses to said multiple WANs, wherein each set of target IP addresses is designated to a respective WAN of said multiple WANs, and wherein said switching logic is further configured to select an initial WAN for said data transmission based on said default configuration, and wherein further said switching logic is further configured to match said target IP to an assigned WAN based on said default configuration using a HASH function and prior to dynamically selecting a WAN for said target IP.

11. The network device of claim 10, said default configuration is organized as a flow table in compliance with an OpenFlow protocol, wherein said switching logic is further configured to: modify said flow table based on evaluated network performance; and route said data transmission based on a modified flow table.

12. The network device of claim 10, wherein said network performance is evaluated by monitoring a round-trip time (RTT) and a number of lost packets for said data transmission against predetermined values.

13. The network device of claim 10, wherein said switching logic is further configure to:
determine a switching frequency; and
determine a duration since switching to said first WAN based on said evaluated network performance, wherein said data transmission is switched to said second WAN responsive to a determination that said duration exceeds a prescribed time limit, wherein said prescribed time limit dynamically varies with said switching frequency.

14. The network device of claim 10, wherein said switching logic is further configured to identify a field value in a TCP packet comprising said request, wherein said data transmission is switched to said second WAN based on a determination said field value indicative of an initial connection request.

15. An apparatus comprising:
network interface ports configured to couple said apparatus to multiple wide area networks (WANs) and to a local area network (LAN);
memory storing a flow table in compliance with an OpenFlow protocol;
switching logic configured to:
select a first WAN from said multiple WANs for supplying Internet connection for said LAN;
identify a request for data transmission between a user device in said LAN and a target IP address that is accessible through said multiple WANs, wherein said apparatus is a separate device from any terminal device in said LAN;
route said data transmission between said user device and said target IP address through a first WAN of said multiple WANs;
monitor and evaluate network performance in real-time with respect to said data transmission through said first WAN in both transmission directions during a transmission connection between said user device and said target IP address;
responsive to a determination that said network performance is below predetermined criteria, modify said flow table to identify a second WAN based on said network performance, wherein said apparatus is configured to perform said determination based on said dynamically monitoring and evaluating and during said data transmission; and switch to said second WAN for supplying Internet connection for said LAN and for said data transmission based on said flow table, wherein switching to said second WAN is transparent to said user device, and wherein said switching to said second communication network comprises updating a flow table in a format defined in compliance with an OpenFlow Protocol, and wherein further said routing data transmission comprises referring to said flow table.

16. The apparatus of claim 15, wherein said memory further stores a default configuration that assigns multiple sets of target IP addresses to said multiple WANs, wherein each set of target IP addresses is designated to a respective WAN of said multiple WANs, and wherein said switching logic is further configured to select an initial WAN from said multiple WAN for said data transmission based on said default configuration.

17. The apparatus of claim 15, wherein said network performance is evaluated by monitoring a round-trip-time (RTT) and a number of lost packets against predetermined values.

18. The apparatus of claim 15, wherein said switching logic is further configure to:
determine a switching frequency; and
determine a duration since switching to said first WAN based on evaluated network performance, wherein said data transmission is switched to said second WAN responsive to a determination that said duration exceeds a prescribed time limit, and wherein said prescribed time limit dynamically varies with said switching frequency.

19. The apparatus of claim 15, wherein said switching logic is further configured to identify a field value in a TCP packet comprising said request, wherein said data transmission is switched to said second WAN based on a determination that said field value indicative of an initial connection request.

* * * * *